United States Patent [19]

Lashyro

[11] Patent Number: 4,901,843
[45] Date of Patent: Feb. 20, 1990

[54] ADVANCING MOTION ROTARY APPARATUS

[75] Inventor: Jeffrey A. Lashyro, Deerwood, Minn.

[73] Assignee: Minnesota Automation, Inc., Crosby, Minn.

[21] Appl. No.: 198,724

[22] Filed: May 19, 1988

Related U.S. Application Data

[63] Continuation-in-part of Ser. No. 847,327, Apr. 2, 1986, abandoned.

[51] Int. Cl.⁴ ............................................. B65G 47/26
[52] U.S. Cl. ............................. 198/418.3; 198/471.1; 198/477.1
[58] Field of Search ............... 156/571, 568, DIG. 29, 156/DIG. 31; 198/468.4, 477.1, 476.1, 420; 414/737, 732

[56] References Cited

U.S. PATENT DOCUMENTS

| | | | |
|---|---|---|---|
| 1,887,211 | 11/1932 | Mortimer | 198/476.1 |
| 2,915,308 | 12/1959 | Matzen | 271/95 |
| 3,302,946 | 2/1967 | Anderson | 271/95 |
| 3,385,595 | 5/1968 | Benatar | 271/95 |
| 3,386,558 | 6/1968 | Benatar | 271/95 X |
| 3,521,879 | 7/1970 | Niemeyer | 271/95 |
| 3,567,559 | 5/1971 | Dullinger | 271/95 X |
| 3,937,458 | 2/1976 | Langen | 271/95 |
| 4,032,388 | 6/1977 | Dunning | 271/95 X |
| 4,050,574 | 9/1977 | Chenevard et al. | 414/737 |
| 4,293,365 | 10/1981 | Geyser et al. | 156/DIG. 31 |
| 4,516,765 | 5/1985 | Stocco et al. | 271/95 |
| 4,530,686 | 7/1985 | Everson . | |
| 4,643,633 | 2/1987 | Lashyro | 414/732 |
| 4,696,715 | 9/1987 | Bahr | 156/DIG. 31 |

FOREIGN PATENT DOCUMENTS

| | | | |
|---|---|---|---|
| 1586374 | 5/1970 | Fed. Rep. of Germany | 271/95 |
| 542228 | 12/1941 | United Kingdom | 198/468.4 |

OTHER PUBLICATIONS

Product Brochure, R. A. Jones & Co., Inc., "Automatic Small Center Constant Motion Cartoner", 1983.

Primary Examiner—Randolph A. Reese
Assistant Examiner—Anthony Knight
Attorney, Agent, or Firm—Anthony G. Eggink

[57] ABSTRACT

A device and process to facilitate the high speed placement of articles onto moving objects by coordinating the velocity of the articles with the velocity of the moving objects. The device comprises a frame structure, a rotary transfer mechanism having an intermittently oscillating center gear and having a plurality of planetary gears in rotational communication with the center gear. An article transfer mechanism is provided having activatable article holding structure and being in fixed rotational communication with at least one planetary gear to impart orbital motion to the articles being transferred. The orbital motion provided by the article transfer mechanism has at least two outwardly extending apex positions. The device has a drive source and a synchronized advancing mechanism which is constructed and arranged to oscillate the center gear at predetermined times as the article holding structure approach as an apex position of travel.

19 Claims, 5 Drawing Sheets

ADVANCING MOTION ROTARY APPARATUS

This is a Continuation-in-Part of application Ser. No. 06/847,327 filed on Apr. 2, 1986 now abandoned.

BACKGROUND OF THE INVENTION

This invention relates to article transfer devices used for the transfer of articles from and to predetermined locations. Particularly, this invention relates to an advancing motion apparatus which is operable on the article transfer mechanism of a rotary transfer device.

Specifically, the advancing motion apparatus or mechanism is directly operative on the normally stationary gear or center gear of the rotary transfer device. The advance motion mechanism is also usable on the normally stationary elements of other devices which transfer articles in a manner similar to that of a rotary transfer device. For example, devices which utilize a stationary or center gear with chains in communication with a planetary gear or those which utilize a stationary pin structure which control the movement of the article transfer mechanism can also be utilized in conjunction with the teachings of the advancing motion mechanism of this invention.

In the automatic transfer of articles from and to predetermined locations, it has increasingly been found that the use of rotary transfer type devices has resulted in high speed and reliable article transfers. And, these rotary devices have been utilized in many industrial and commerical applications and for a variety of high speed transfer purposes. For example, U.S. Pat. No. 4,530,686, entitled "Rotary Packaging Technology", discloses a rotary transfer device designed for the high speed transfer and opening of flat, folded cartons. And, as disclosed therein, the rotary transfer device includes a number of vacuum operated transfer mechanism structures, three for example, and which functions with a time and space synchronized conveyor whereby individual flat folded cartons are deposited by the article transfer mechanism of the rotary transfer device between adjacent flight members of a synchronized conveyor. The advance motion apparatus of this invention is usable with the rotary transfer structures of that patent.

Another device as disclosed by Applicant's assignee in U.S. Pat. No. 4,643,633, entitled "Rotary Transfer Device", shows additional rotary transfer devices wherein the teachings of this invention can be utilized. And, similarly, other known devices which utilize rotary transfer concepts, such as those which use chain drive structures and those which utilize pin arrangements to drive article transfer mechanisms (MGS Machine Corporation), are also suitable for using the teachings of this invention to more precisely and reliably place articles on moving objects. These prior art devices and arrangements all utilize a stationary element or, travel control base member which directly interacts and controls the movement of the cooperating structural elements or article transfer mechanisms which transport various objects or articles.

An object of this invention is to synchronize the movement of the normally stationary element, whether a center gear or other normally stationary movement control structure, with the movement of the article transfer mechanisms of an article transfer device. The result of this synchronized movement is the timed motion of the articles or goods at predetermined locations as they are transferred by the article transfer mechanism. This movement aids in the precise deposit and/or picking of the articles whether onto moving targets or the picking of products of various and specific configurations from an article storage magazine.

In the mechanism disclosed in U.S. Pat. No. 4,530,686, the individual cartons make contact with the conveyor flight members. Thus, any movement between the article transfer mechanism and the synchronized flight members is not necessarily detrimental in the carton opening process, although the teachings of this invention could also be incorporated in that device for purposes of reducing scuffing damage to carton sleeves as well as the damage and wear of the rubber vacuum cups. However, in many article transfer processes, relative movement between the article itself and that of the placement location is extremely detrimental from a precise article placement standpoint.

For example, in the placement process of coupons or labels to or on moving objects, such as packages, or in the placement of window elements on cartons, any relative movement between the individual coupon and package causes inherent placement difficulties and damage, particularly in high speed placement operations. And, heretofore, such placement problems have not been fully resolved. In the placement of coupons on cigarette packages, for example, high speed operations have not been realized heretofore because of the inherent limitation of the transfer devices in the precise placement of a generally non-moving object onto a moving target.

The advancing motion mechanism of this invention overcomes the difficulty and problems associated with the precise placement of articles onto moving targets. The advancing motion mechanism of this invention incorporates an intermittent and synchronized advancing motion at the time of deposit of the article so that the article is placed while in motion onto the moving target. And, the advancing motion mechanism of this invention permits this advancing motion to be incorporated into various rotary transfer devices which have been found to be reliable in the high speed placement of articles.

In the past, various devices have been proposed to transfer and place articles, such as coupons, on moving objects such as cigarette packages. However, these devices have generally been unsuccessful in obtaining a precise, reliable and damage-free placement because of their inability to match the speed of the article to that of the moving object.

The advancing motion mechanism of this invention overcomes the limitations and shortcomings of these prior art devices. And, as far as is known, the advancing motion mechanism of this invention fulfils a long standing need in the article placement industry that heretofore has not been solved.

SUMMARY OF THE INVENTION

This invention provides devices and processes to facilitate the high speed and accurate placement of articles on moving objects by coordinating the velocity of the article with the velocity of the moving objects. The device is comprised of a frame structure, and a rotary transfer mechanism having a timed and intermittently reciprocating center gear. The rotary transfer device further has a plurality of planetary gears which are in rotational communication with the center gear.

The device is further comprised of at least one article transfer mechanism having activatable article holding members being in fixed rotational communication with at least one planetary gear to impart orbital motion to the articles being transferred. The orbital motion is provided by the article transfer mechanism which has at least two outwardly extending apex positions of travel, one position being for the picking of the article and the other being for the placement of the article, for example. A synchronized advancing means is provided and which is constructed and arranged to rotate the center gear at predetermined times as the article holding members approach one of the apex position to place or pick the article. A drive means is further provided for the rotary transfer mechanism and for the synchronized advancing means.

This invention further provides advancing means which are comprised of various cam and cam follower arrangements as well as linkage mechanisms communicating the cam followers and the center gear of the rotary transfer device. The advancing means further are constructed to facilitate rotary devices having a plurality of center gears as well as a plurality of article transfer mechanisms.

Also provided by this invention are devices having cam structures with a plurality of operative lobe or cam track portions and cooperating cam follower or roller arrangements, and having a plurality of linkage mechanisms in communication with the center gear(s) so that a plurality of article transfer mechanisms can be utilized in a rotary transfer device to provide increased and stable article transfer speeds.

These and other benefits of this invention will become clear from the following description by reference to the drawings.

DESCRIPTION OF THE PREFERRED EMBODIMENTS

Figure 1:
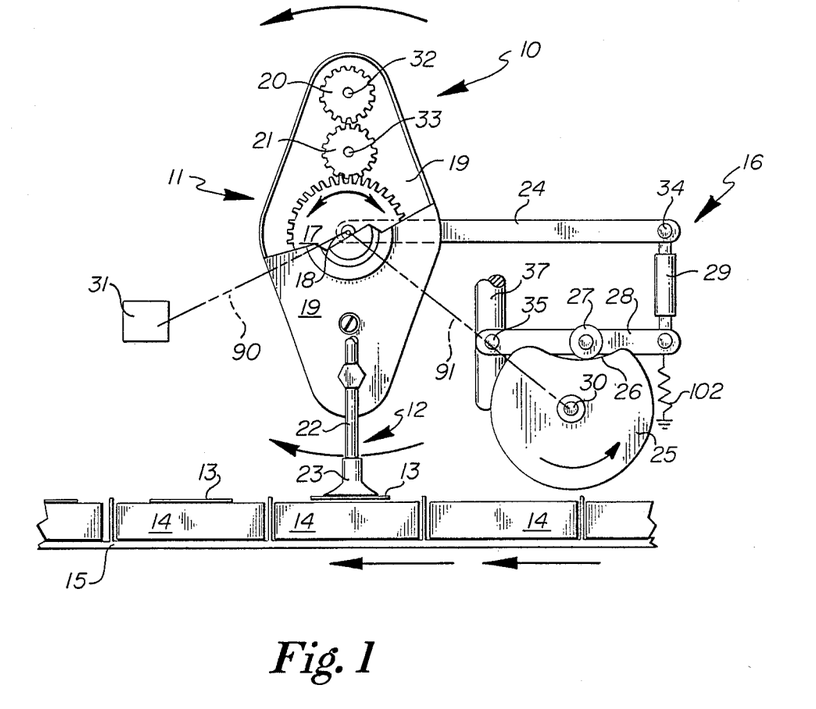
FIG. 1 is a schematic side plan view of a rotary advancing motion apparatus showing the advancing mechanism of this invention used with a rotary transfer device.

Referring to FIG. 1 of the drawings, a side plan view illustrates the advancing motion rotary apparatus 10 of this invention which is utilized to impart an intermittant synchronized movement to the article transfer mechanism 12 of a rotary transfer device 11. The article transfer mechanism 12 which has a vacuum stem 22 and a vacuum cup 23 is used to place an article 13, such as a coupon, on a moving object 14, such as a cigarette package, which is carried or transported at a constant velocity on the conveyor means 15.

The advancing means 16 of this invention acts upon the rotary transfer device 11 whereby the article 13 is accelerated at an apex position of travel of the article transfer mechanism 12 so that the speed of the article 13 substantially matches the speed of the moving object 14 carried on conveyor means 15. This apex position of travel is shown to be at the bottom of the rotary transfer device where the article 13 is released onto the moving object 14.

FIG. 1 further shows the rotary transfer device 11 to have a center gear 17 mounted and rotatable on center shaft 18. A supporting plate structure 19 further rotates continuously about or with center shaft 18 as is disclosed in U.S. Pat. No. 4,530,686. In accordance with the teachings of U.S. Pat. No. '686, the supporting structure 19 is shown being rotated in a counter clockwise direction as indicated by the arrow at the top of FIG. 1, while the article transfer mechanism 12 is shown being rotated in a clockwise direction as indicated by the bottom arrow.

Figure 2:
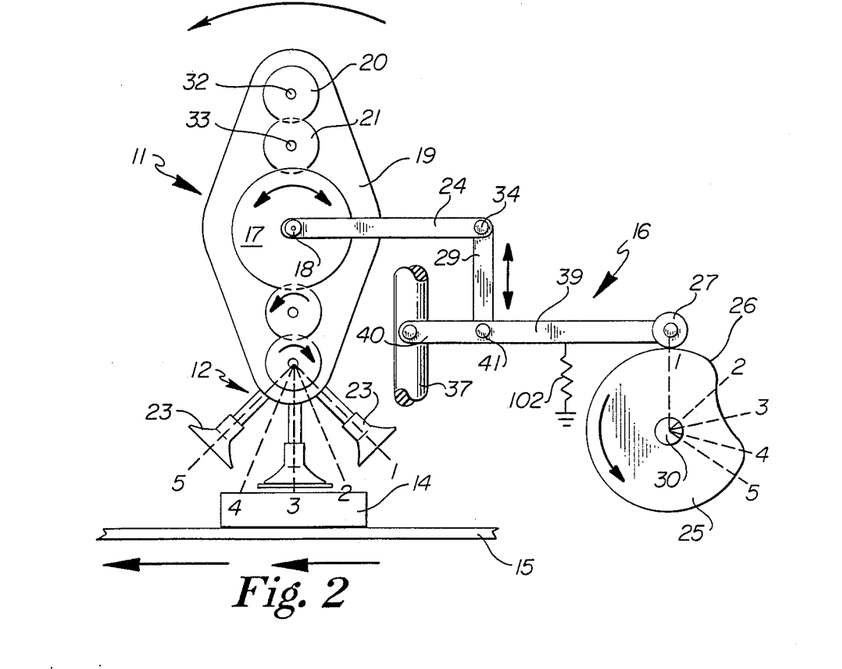
FIG. 2 is a side view of an advance motion rotary apparatus having another embodiment of the advancing mechanism of this invention and further showing a geometric time-location diagram of the article transfer mechanism placement of an article onto a moving product at an apex position of travel.

As shown with respect to FIGS. 1 and 2.

Mounted for rotation with supporting plate structure 19 are planetary gears 20 and idler gears 21 which respectively have shafts 32 and 33. The idler gears 21 are in meshing engagement with center gear 17 and the planetary gears 20 are in meshing engagement with the idler gears 21, and the article transfer mechanism 12 is in fixed communication with the journaled shaft 32 (as shown in FIG. 2 of the '633 patent and FIG. 3 of the '686 patent as well as FIG. 5 of the present drawings) so that the article transfer mechanism 12, as indicated by arrow B, rotates as the supporting plate structure 19, as indicated by arrow A, is rotated with respect to center gear 17.

Importantly, although the center gear as disclosed in the U.S. Pat. No. 4,530,686 is stationary, the center gear 17 of this invention is rotatable at predetermined times during the path of travel of the article 13 carried by the article transfer mechanism 12. Thus, in effect and as a result, the article transfer mechanism 12 is further rotated at predetermined locations during its normal rotational movement.

The intermittent movement, as indicated by arrow C, of the center gear 17 in this invention is controlled and synchronized by the advancing means 16. FIG. 1 shows the advancing means 16 to be comprised of an advancing linkage 24 which is attached at the end directly to the center gear 17 for oscillating the center gear 17 and which communicates at its opposite end to a reciprocating linkage arm 29 via a pivot point connection 34. Reciprocating linkage arm 29 is further pivotally attached at the end of a cam roller arm 28 having a cam roller or follower 27. The other end of arm 28 is attached at a fixed pivot position 35 on a frame portion 37. The cam roller or follower 27 rides on a cam structure 25 having a cam curvature or track 26. The cam structure 25 is rotated about cam shaft 30. In this open cam 25 arrangement, biasing means 102 maintains cam roller 27 contact with the outer surface or cam track 26 of cam 25.

A synchronized drive means or power source 31 is provided to drive both the rotary transfer device 11 and the advancing means 16, and in some instances the conveyor means 15 can also be driven if desired. As shown, the power source 31 rotates the respective shafts 18 and 30 via drive chains or belts 90 and 91. The article transfer mechanism 12 of rotary transfer device 11 is rotated due to movement of cam 25 on cam shaft 30 which causes the cam roller 27 to impart synchronized movement on the center gear 17 by means of advancing means 16.

FIG. 2 illustrates a geometric time-location diagram which shows the advancing motion means 16 operative on article transfer mechanism 12 at its lower apex or placement position of travel where article 13 is placed onto the moving object 14. The advancing means 16 is shown to be comprised of an open cam structure 25 having cam curvature configuration or track 26. A cam roller or follower 27 is rotatably connected at one end of cam roller arm 39 which has a fixed pivotal connection 40 on frame portion 37 at its opposite end. Intermediate the ends of arm 39 is a pivot connection 41 which attaches linkage arm 29 to the advancing linkage 24 at pivot connection 34. Biasing means 102 is connected to the cam roller arm 39 to maintain contact of the cam roller 27 with the peripheral cam track surface 26. The opposite end of the advancing linkage 24 is fixed to the center gear 17 directly or to the center shaft 18 if the center gear 17 is fixed thereto, so that the up and down movement to the end of advancing linkage 24, as shown by the arrow with respect to linkage arm 29, directly results in the oscillating motion of the center gear 17 as also shown by the arrows thereon.

Particularly, FIG. 2 illustrates the movement of the article transfer mechanism 12 with respect to the corresponding location of the cam roller 27 to the exterior curved locations of the cam track 26 as marked as Positions 1, 2, 3, 4 and 5 as the cam 25 is rotated in a synchronized manner with the rotary transfer device 11, as discussed with respect to FIG. 1.

As previously discussed, the rotary transfer devices of the '686 patent and those of the '633 patent have fixed center gears or so-called "stationary gears." In one machine cycle of a standard rotary transfer device having those fixed or stationary gears, the article transfer mechanism picks up an article from a magazine at an apex position at zero speed. In other words, the vacuum cups momentarily stop at that position to pick an article as the vacuum is actuated. Thereafter, the article transfer mechanism undergoes constant rotational speed or motion with respect to the supporting plates until it reaches the placement location where the mechanism reaches another apex position and releases the article, again at zero speed, as the vacuum is deactivated. Thereafter, the article transfer mechanism again travels at constant speed until it reaches its original apex position. As discussed in U.S. Pat. Nos. '686 and '633, a rotary transfer device can have any number of apex positions depending upon the gear ratios between the center or stationary gear and the planetary gears. For example, a third apex position can be provided so that an article can make contact with a glue station prior to placement.

In contrast to the standard operation of a true stationary gear transfer device as above described, differences result in each machine cycle utilizing the advancing motion apparatus of this invention as discussed with respect to FIG. 2. In this machine cycle, a different motion begins after the article is removed from the storage magazine where the article transfer mechanism is at its first apex position and has momentary zero speed. Thereafter, the article transfer mechanism undergoes standard constant motion until, due to a change in the cam track curvature 26 as shown in position 1 in FIG. 2, for example, the article transfer mechanism is decelerated. In constrast to the constant motion of the normal operation of the device, the vacuum cups of the article transfer device 12 as shown in FIG. 2, are moved in a backed-up configuration due to the deceleration caused by the cam track 26. Thereafter at position 2 of FIG. 2, the article transfer mechanism begins to accelerate until it reaches or matches the velocity of the object 14 on which it is placed at position 3. The article transfer mechanism continues or follows through by accelerating at position 4 until the vacuum cups are returned to their normal position in comparison to the standard operation of a stationary gear rotary device at position 5. The article transfer mechanism travels at its normal or standard speed thereafter until another article is removed at the magazine as the mechanism reaches zero-speed at the first apex position. As the article reaches the lower apex position of travel the decelerated and accelerated movement as described above with respect to positions 1-5 is repeated as the cam follower is radially displaced by the movement of the cam structure 25.

Figure 3:
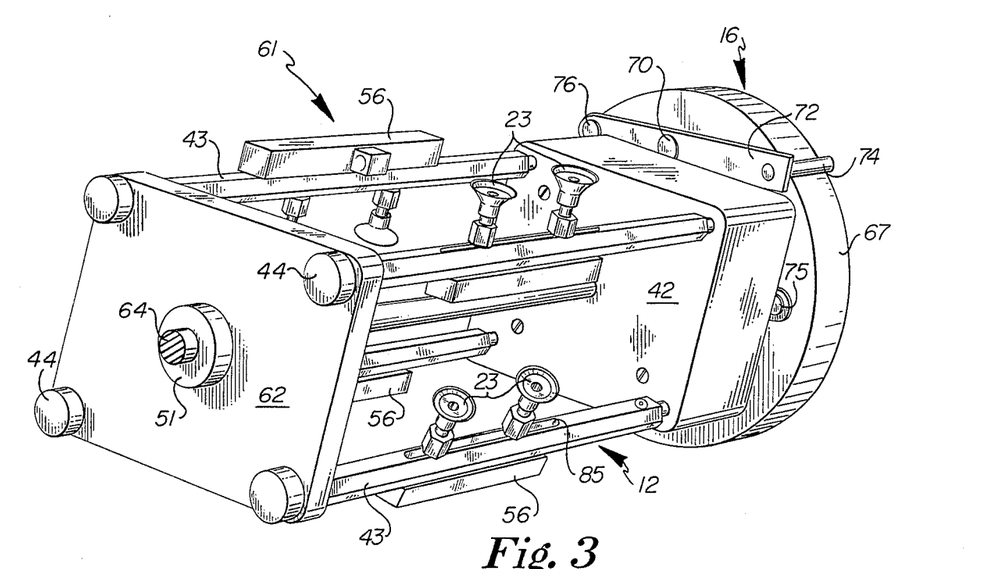
FIG. 3 is a perspective view of a rotary transfer device having two pairs of article transfer mechanisms and having the advancing mechanism of this invention.
Figure 4:
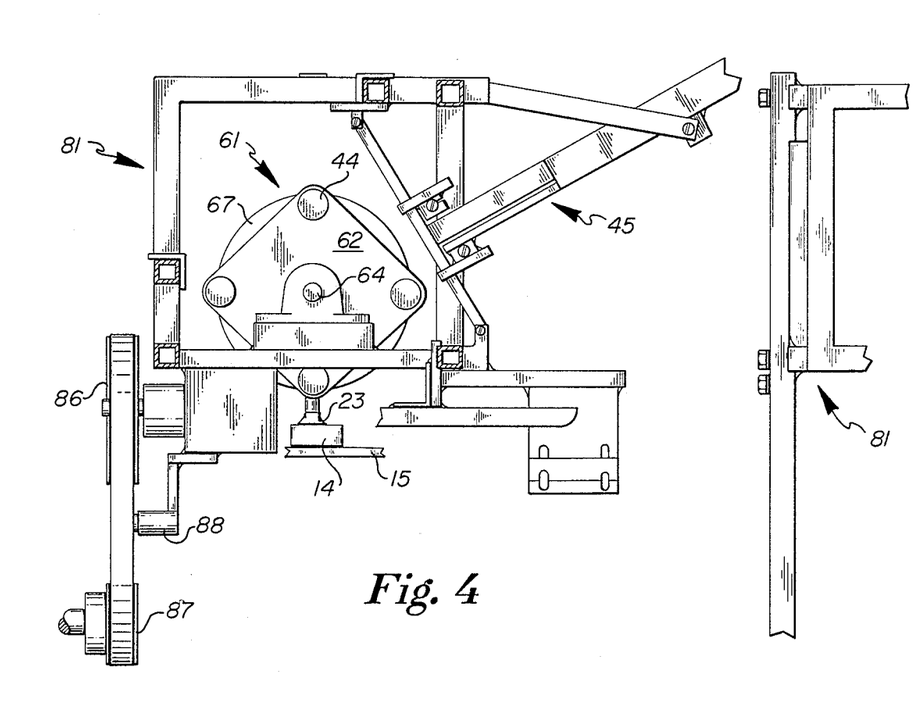
FIG. 4 is a plan view of the advance motion rotary apparatus of FIG. 3 and further showing its frame and cooperating elements.

FIGS. 3 and 4 show perspective and side views of a rotary transfer device 61 having four article transfer mechanisms 12 and having the article transfer advancement means 16 of this invention. The rotary transfer device 61 has a frame structure 81, a timing pulley 86, a drive pulley 87 a belt tensioner 88 and an article storage magazine 45. Each article transfer mechanism 12 has vacuum cups 23 adjustably extending from slots 85 in the vacuum cup shaft 43. The vacuum cups 23 are aligned with the storage magazine 45 to transfer articles onto objects 14 on conveyor 15.

Figure 5:
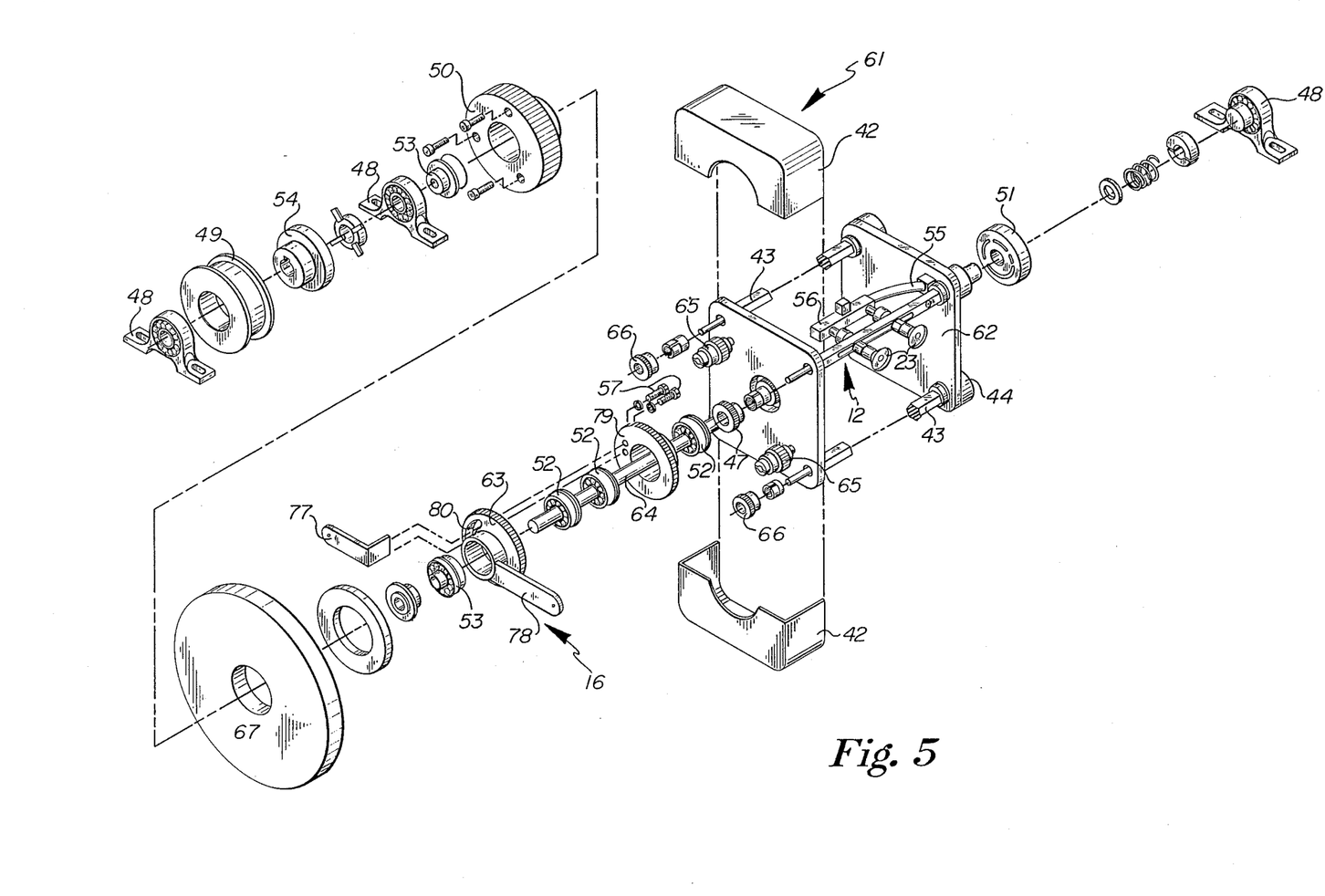
FIG. 5 is an exploded perspective view of the rotary transfer device and advancing mechanism of FIG. 3.

FIG. 5 is an exploded view which further shows the elements and cooperating structure of this device and the advancing motion mechanism of this invention. The transfer device 61 is shown to have opposing side plate structures 62. The plate structure 62 adjacent the gearing mechanism of the device and the advancing means 16 has a guard enclosure 42. The device has two center gears, namely, an outside center gear 63 and an inside center gear 79. As further shown in FIG. 6, center gear 79 drives one pair of journaled idler gears 65 which are in communication with planetary gears 66, while center gear 63 drives idler gears 46 which are in communication with planetary gears 47.

The center gears 63 and 79, as well as the cam structure 67, timing pulley 49, drive pulley 50 and the vacuum valve 51 are mounted to center shaft 64, which utilizes pillow block bearing structures 48, bushing 54 and bearing structure 52 and 53 to unite the assembly about the side plate structures 62 for use. The vacuum cup shafts 43 have journaled ends 44 and have vacuum blocks 56 that are communicatively connected via vacuum lines 55 to the valve 51 to activate and deactivate the cups 23 at predetermined times and locations.

As further shown, advancing linkage 78 is connected to and extends from center gear 63 and advancing linkage 77 extends through slot 80 in center gear 63 and is connected to center gear 79 by fasteners or bolts 57. Thus, advancing linkage 77 reciprocates through center gear 63 as further shown in FIG. 6.

Figure 6:
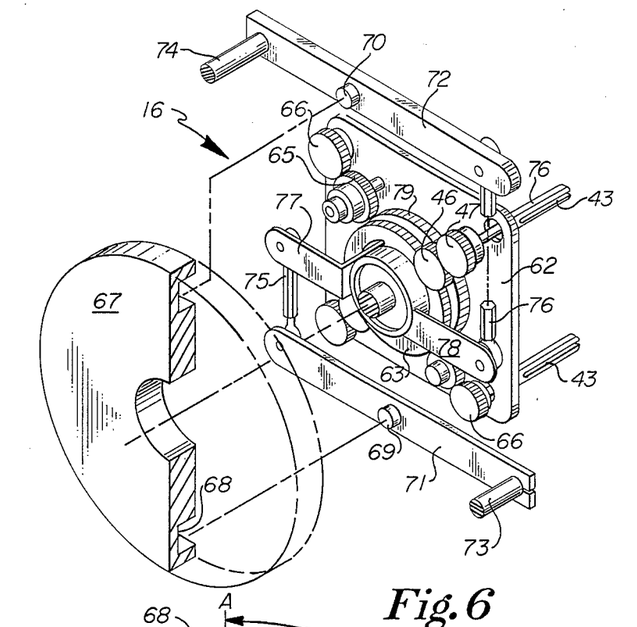
FIG. 6 is another perspective separated view showing the advancing mechanism of this invention.

Referring to FIGS. 5 and 6, the center shaft 64 of the rotary device 61 is shown to have the closed cam structure 67 mounted for rotation therewith. Thus, as the cam followers 69 and 70 ride inside the cam track slot 68, the respective cam roller arms 71 and 72 being pivotally fixed at frame points 73 and 74, cause their respective linkage arms 75 and 76 to impart oscillating motion to the respective advancing linkage members 77 and 78 which are respectively connected to the outside and inside center gears 63 and 79. To maintain a smooth operation of four transfer mechanism devices, it has been found beneficial to drive a pair of opposing transfer mechanisms 12 by using the two center gears 63 and 79. This arrangement can smoothly provide 400 placements per minute.

Figure 7:
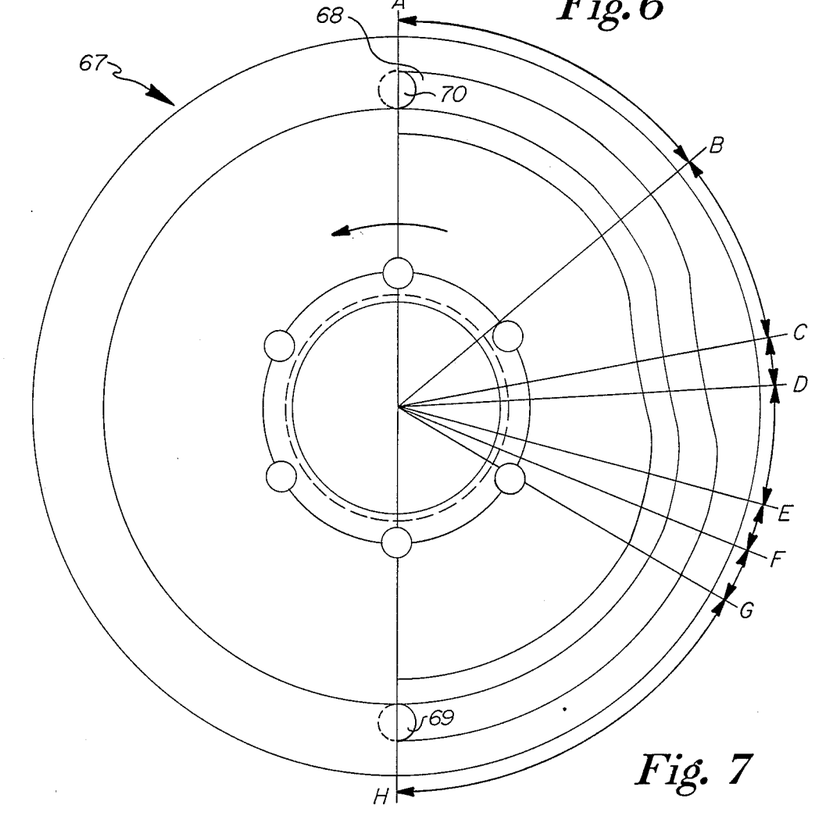
FIG. 7 is a schematic side plan view of the cam structure of the advancing mechanism of this invention.

FIG. 7 illustrates a closed cam structure 67 and FIG. 6 shows the linkage mechanism of the advancing means which are used with the rotary transfer device 61 of FIGS. 3, 4, and 5. Referring to FIG. 7, the closed cam structure 67 has an interiorly disposed cam curvature slot or cam track 68 for receiving the cam followers 69 and 70 shown in FIG. 6. The cam curvature slot 68 is shown to have specific dwell times and specific slopes to attain the advancing motion of the article transfer mechanisms as discussed with respect to FIG. 2. The cam track curvature or radial change with respect to the center of the cam directly affects the movement of the cam followers. Thus, the locations marked A-H provide the accelerated and decelerated positions of the cam followers. The closed cam structure 67 has two such opposing curved configurations so that two cam followers 69 and 70 are able to be actuated as the cam structure rotates. This particular cam structure 67 is, therefore, designed to be geared at one half the rotational speed of the respective center gears.

Thus, the configuration of the cam track 68 determines both the change in rotational velocity or acceleration as well as the duration of this change for the article transfer mechanism. As a result, the movement of the transferred articles can be easily controlled to match conveyor speed to thereby accurately place articles onto high speed moving targets.

Figure 8:
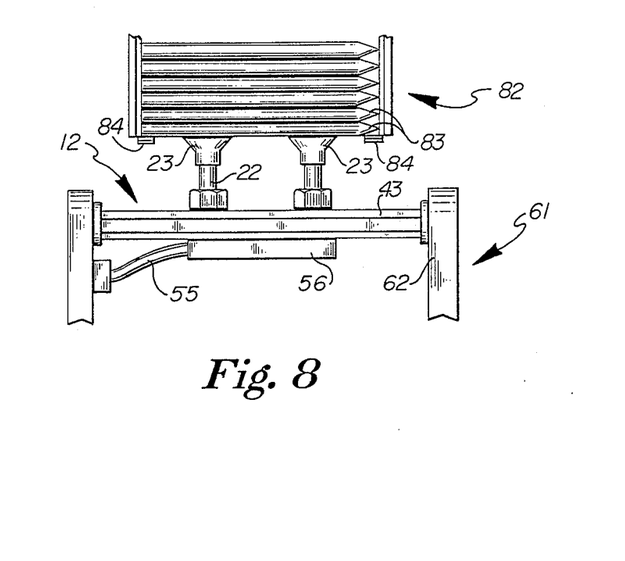
FIG. 8 is a top plan view showing an article transfer mechanism removing an article from a storage magazine using the advancing mechanism of the invention.
Figure 9:
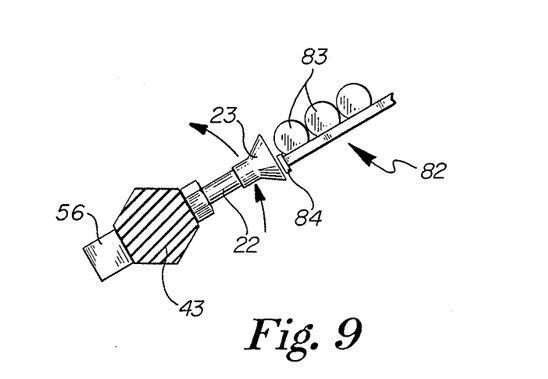
FIG. 9 is a lateral plan view of the article transfer mechanism of FIG. 8.

FIGS. 8 and 9 show another use of the advancing mechanism of this invention. Here the article transfer mechanism 12 is shown in use with an article storage magazine 82 having clips 84 holding a supply of elongated articles 83, such as pens. The presence of the retaining clips 84 make difficult the removal of these articles when utilizing an article transfer device. However, the advancement mechanism when operative at this apex position of travel lifts the individual articles over the clips as the vacuum line activates the cups 23 as they sweep past the clips 84. Thus, as opposed to the zero-speed, straight line travel of the vacuum cups as a result of the usual transfer device motion, the advancement mechanism of this invention rotates the vacuum cups at the apex position to enable retained articles to be engaged and transferred. The advancement mechanisms discussed above, therefore, are applicable to picking as well as the placement of articles.

As shown in the drawing figures and discussed above, a variety of open and closed cam configurations can be utilized to achieve the oscillating motion of a center gear of a rotary transfer device and to achieve the advancing motion of the article transfer mechanism. Additionally, a variety of linkage mechanisms can be employed to transfer the motion imparted by the cam/cam follower arrangements to the center gear of the rotary transfer devices. And, as discussed, it is important that the movement of the advancing means be synchronized with that of the rotary transfer device, which in turn is synchronized with the conveyor means on which the objects are carried for receiving the articles placed by the article transfer mechanisms of the rotary transfer device. Optionally, as is known, the conveyor means can be independently synchronized (i.e., electronically) with the article transfer device.

As discussed above and shown in the drawing figures, the invention includes the process for placing articles on moving objects at a predetermined velocity. A conveyor means is provided for transferring objects, such as cigarette packages, for example. An article transfer device having an article transfer mechanism rotationally traveling in an orbital path with apex positions is provided to pick or place and transfer the articles, such as coupons. For example, the article transfer device provided may be a rotary transfer device having a rotatable center shaft wherein advancing means can be provided. The advancing means includes a cam and cam follower arrangement and a communicating linkage mechanism that is operative on its center gear. The article transfer devices provided in the process of matching the speed and placing articles on moving objects, and on which the advancing means is operative, may also include other prior art devices, such as those utilizing chain and sprocket drives or those utilizing pin members mounted on a planar structure to drive rotating article mechanisms. An apex position of travel of the rotating article transfer mechanism is synchronized with the objects traveling on the conveyor means. The article transfer mechanism advancing means is operative on and oscillates the travel control base member at the apex position of article travel.

Finally, synchronized drive means are provided for the article transfer device and the advancing means. Thus, the process results in the article transfer mechanism being advanced in speed at the apex position of article travel to match the speed of the objects transfered on the conveyor means.

As many changes are possible to the embodiments of the advancing motion rotary apparatus utilizing the teachings of the invention, the descriptions above and the accompanying drawings should be interpreted in the illustrative and not in the limited sense.

That which is claimed is:

1. In an article transfer device having at least one article transfer mechanism to pick, place and tranfer articles via apex positions of travel and having a synchronized travel control base member in positive rotational communication with the article transfer mechanism, an advancing assembly reciprocatingly operative on said travel control base member, said advancing assembly being synchronized with said article transfer mechanism at an apex position of travel and being constructed and arranged to vary the rotational speed of the article transfer mechanism at a predetermined position of travel, whereby the reciprocating movement of said advancing assembly controls the accurate positioning of the article transfer mechanism.

2. The advancing assembly of claim 1, wherein said article transfer device is a rotary transfer device having a center gear and wherein said advancing assembly is constructed and arranged to oscillate the center gear of the rotary transfer device and being comprised of a cam structure and cam follower arrangement, said cam follower undergoing movement and having means to oscillate the center gear.

3. The assembly of claim 2, wherein said cam structure is an open cam structure and wherein said cam follower arrangement has biasing means to maintain cam follower contact with said open cam structure.

4. The assembly of claim 2, wherein said cam structure is a closed cam structure having a cam track therein for movement of said cam follower.

5. An advancing motion apparatus to impart an intermittent synchronized movement to a rotary transfer device having an article transfer mechanism, said apparatus comprising:
   (a) a frame structure for supporting the rotary transfer device, said rotary transfer device having a center shaft,
   (b) a center gear provided for intermittent rotational movement about said center shaft,
   (c) a supporting plate structure mounted for rotation to said center shaft,
   (d) a planetary gear for rotation with said supporting plate structure and about said center gear,
   (e) means for driving said planetary gear about said center gear,
   (f) an article transfer mechanism mounted for rotation with said planetary gear and having at least one apex position of travel,
   (g) a linkage mechanism in communication with said center gear for intermittently rotating said center gear,
   (h) reciprocating means active on said linkage mechanism, and
   (i) synchronized drive means operative on said center shaft and said reciprocating means, whereby said reciprocating means advances said article transfer mechanism at said apex position.

6. The apparatus of claim 5, wherein said reciprocating means is comprised of a cam and cooperating cam follower arrangement and wherein said cam follower movement is operative on said linkage mechanism.

7. The apparatus of claim 5, wherein the rotary transfer device has a plurality of planetary gears, a plurality of article transfer mechanisms and wherein said reciprocating means is a double cam lobe with a cooperating double cam follower arrangement each being operative on a separate article transfer mechanism.

8. The apparatus of claim 5, wherein said reciprocating means comprises a closed cam structure having a cam track therein for receiving a cam follower.

9. The apparatus of claim 8, wherein said cam structure additionally has two followers, two linkage mechanisms and wherein said apparatus has two center gears and at least two article transfer mechanisms each being in communication with one said cam follower, and wherein said synchronized drive means rotates said article transfer mechanisms two revolutions for each one revolution of said cam structure.

10. A device to facilitate the high speed placement of an article onto a moving object and to synchronize the velocity of the article with the velocity of the moving object, said device comprising:
   (a) a frame structure,
   (b) a rotary transfer device having an intermittently rotatable center gear and having a plurality of planetary gears in rotational communication with said center gear,
   (c) an article transfer mechanism having activatable article holding means being in fixed rotational communication with at least one said planetary gear to impart orbital motion to articles being transfered, said orbital motion provided by said article transfer mechanism having at least two outwardly extending apex positions,
   (d) synchronized advancing means constructed and arranged to oscillate said center gear at predetermined times as said article holding means approaches one said apex position, and
   (e) drive means for said rotary transfer mechanism and for said synchronized advancing means.

11. The device of claim 10, wherein said advancing means is comprised of a cam with cam follower arrangement and having a linkage mechanism communicating said cam follower and said center gear of the rotary transfer mechanism.

12. The device of claim 10, wherein said rotary transfer device has a plurality of center gears and a plurality of article transfer mechanisms and wherein said advancing means has a cam with a plurality of varying cam track contour areas, a plurality of cam followers, and a plurality of linkage mechanisms in communication with said center gears and said cam followers, a predetermined cam follower being rotationally connected to a predetermined linkage mechanism to advance a predetermined center gear.

13. The device of claim 10, wherein said advancing means comprises a closed cam structure having a cam track therein for receiving a cam follower.

14. The device of claim 13, wherein said cam structure additionally has two followers, two linkage mechanisms, one linkage mechanism being connected to one said follower and wherein said transfer device has two center gears, each said center gear being connected to one said linkage mechanism and at least two article transfer mechanisms each being in communication with one said cam follower, and wherein said synchronized drive means rotates said article transfer mechanisms two revolutions for each one revolution of said cam structure.

15. In an apparatus for placing articles onto moving objects at a predetermined velocity having an article transfer device with a frame structure and an article transfer mechanism traveling in orbital motion with apex positions of travel about a center shaft and being in synchronized movement with a conveyor means for transferring objects, an advancing mechanism comprising a synchronized advancing means comprising a reciprocating structure in communication with said article transfer mechanism constructed and arranged to oscillate the article transfer mechanism and to accelerate the rotational movement of the article transfer mechanism at said apex position and synchronized drive means operative on said advancing means, said article transfer device and the conveyor means.

16. In the apparatus of claim 15, wherein said article transfer device is a rotary transfer device having at least one center gear.

17. In the apparatus of claim 16, wherein said rotary transfer device has a plurality of center gears and a plurality of article transfer mechanisms and wherein said synchronized advancing means is comprised of a cam having a varying cam track contours, a plurality of cam followers and a plurality of linkage mechanisms in communication with each said article transfer mechanism.

18. In the apparatus of claim 15, wherein said synchronized advancing means is comprised of a cam and cam follower arrangement and a linkage mechanism, said linkage mechanism being in communication with said cam follower and said article transfer mechanism.

19. In the apparatus of claim 15, wherein said advancing mechanism comprises a closed cam structure having a cam track therein for receiving a cam follower.

* * * * *